(12) United States Patent
Saravanan et al.

(10) Patent No.: US 11,943,367 B1
(45) Date of Patent: Mar. 26, 2024

(54) GENERIC CRYPTOGRAPHY WRAPPER

(71) Applicant: Marvell Asia Pte Ltd, Singapore (SG)

(72) Inventors: Dhanalakshmi Saravanan, Bangalore (IN); Raga Sruthi Nemalipuri, Hyderabad (IN); Priya Ainapur, Secunderabad (IN); K. Raveendra, Visakhapatnam (IN); Bapu Hinge, Bangalore (IN)

(73) Assignee: Marvell Asia Pte, Ltd., Singapore (SG)

( * ) Notice: Subject to any disclaimer, the term of this patent is extended or adjusted under 35 U.S.C. 154(b) by 441 days.

(21) Appl. No.: 17/323,263

(22) Filed: May 18, 2021

Related U.S. Application Data

(60) Provisional application No. 63/027,106, filed on May 19, 2020.

(51) Int. Cl.
| | |
|---|---|
| *H04L 29/06* | (2006.01) |
| *H04L 9/06* | (2006.01) |
| *H04L 9/08* | (2006.01) |
| *H04L 9/32* | (2006.01) |

(52) U.S. Cl.
CPC .......... *H04L 9/3242* (2013.01); *H04L 9/0631* (2013.01); *H04L 9/0861* (2013.01)

(58) Field of Classification Search
CPC .... H04L 9/3242; H04L 9/0631; H04L 9/0861
See application file for complete search history.

(56) References Cited

U.S. PATENT DOCUMENTS

| | | | | |
|---|---|---|---|---|
| 5,689,565 | A * | 11/1997 | Spies | ............... G06F 21/602 |
| | | | | 713/176 |
| 6,865,426 | B1 * | 3/2005 | Schneck | ............... H04L 63/105 |
| | | | | 700/8 |
| 9,166,793 | B2 * | 10/2015 | Poovendran | .......... H04L 9/3242 |
| 9,571,279 | B2 | 2/2017 | Kancharla et al. | |
| 10,187,358 | B2 * | 1/2019 | Fahey | ................ H04L 63/0428 |
| 2001/0033656 | A1 * | 10/2001 | Gligor | .................. H04L 9/0637 |
| | | | | 380/28 |

(Continued)

FOREIGN PATENT DOCUMENTS

| | | | | |
|---|---|---|---|---|
| CN | 106301793 B | * | 4/2018 | ........... H04L 9/0631 |
| CN | 110313146 A | * | 10/2019 | ........... H04L 9/0662 |
| JP | 2011160229 A | * | 8/2011 | |

OTHER PUBLICATIONS

Oszywa et al., "Combining message encryption and authentication", 2011, Annales UMCS Informatica AI XI, 2 (2011), pp. 61-79 (Year: 2011).*

*Primary Examiner* — John B King
(74) *Attorney, Agent, or Firm* — Young Basile Hanlon & MacFarlane, P.C.

(57) ABSTRACT

An apparatus for performing cryptographic primitives includes a processor that is configured to receive an instruction to perform a cryptographic primitive, where the instruction includes one or more operands, at least one of the operands indicates one or more data structures that include values for the cryptographic primitive, and where the values include a first value indicating a mode of encryption that indicates an order of performing an encryption operation and an authentication operation and a second value indicating a cipher type; and perform the cryptographic primitive and store an output of the cryptographic primitive in an output data structure.

19 Claims, 7 Drawing Sheets

(56) References Cited

U.S. PATENT DOCUMENTS

| | | | |
|---|---|---|---|
| 2002/0049909 A1* | 4/2002 | Jackson | H04L 9/3247 |
| | | | 713/188 |
| 2002/0174332 A1* | 11/2002 | Vialen | H04L 9/0643 |
| | | | 713/152 |
| 2002/0196935 A1* | 12/2002 | Wenocur | H04L 63/12 |
| | | | 380/37 |
| 2004/0139321 A1* | 7/2004 | Shaffer, II | H04L 63/126 |
| | | | 713/170 |
| 2007/0157030 A1* | 7/2007 | Feghali | G06F 21/602 |
| | | | 713/189 |
| 2011/0191599 A1* | 8/2011 | Chou | H04L 9/0877 |
| | | | 713/193 |
| 2014/0223192 A1* | 8/2014 | Dent | G06F 21/52 |
| | | | 713/189 |
| 2015/0358294 A1 | 12/2015 | Kancharla et al. | |
| 2017/0061832 A1* | 3/2017 | Ghosh | H04L 9/0631 |
| 2017/0111330 A1* | 4/2017 | Mosko | H04L 63/123 |
| 2018/0262327 A1* | 9/2018 | Jain | H04L 12/40013 |
| 2019/0007390 A1* | 1/2019 | Wu | H04L 9/3226 |
| 2019/0132127 A1* | 5/2019 | Birke | H04L 9/0869 |
| 2020/0067698 A1* | 2/2020 | Schmatz | H04L 9/0894 |
| 2020/0358763 A1* | 11/2020 | Kii | H04L 63/0823 |
| 2021/0120009 A1* | 4/2021 | Kostka | H04W 12/08 |
| 2021/0367771 A1* | 11/2021 | Gray | H04L 9/0894 |
| 2023/0146558 A1* | 5/2023 | Dorcey | G06Q 20/206 |
| | | | 705/75 |

* cited by examiner

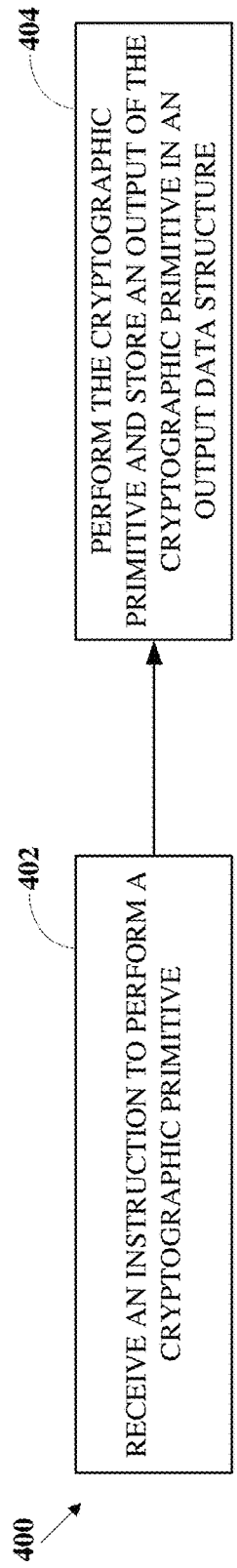
FIG. 4
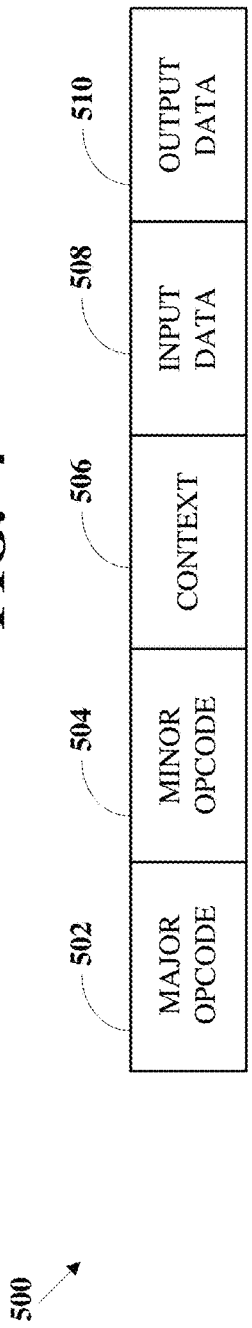
FIG. 5
| Opcode | DWord0 | Bitfield | Value/Description |
|---|---|---|---|
| Major | OPCODE | 15:8 | 0x33 (FC) |
| Minor | ARG | 7:5 | Unused |
| | | 4 | Mode of Encryption (HMAC_First bit) |
| | | | 0: Encrypt first then Authenticate |
| | | | 1: Authenticate first then Encrypt |
| | | 3 | Reserved. Must be zero |
| | | 2 | 1: CRC32 support |
| | | 1 | 1: DOCSIS support |
| | | 0 | 0: Encrypt + HMAC |
FIG. 6

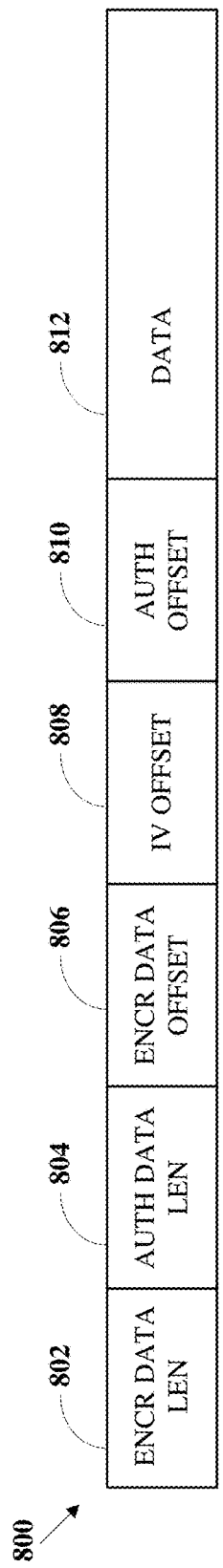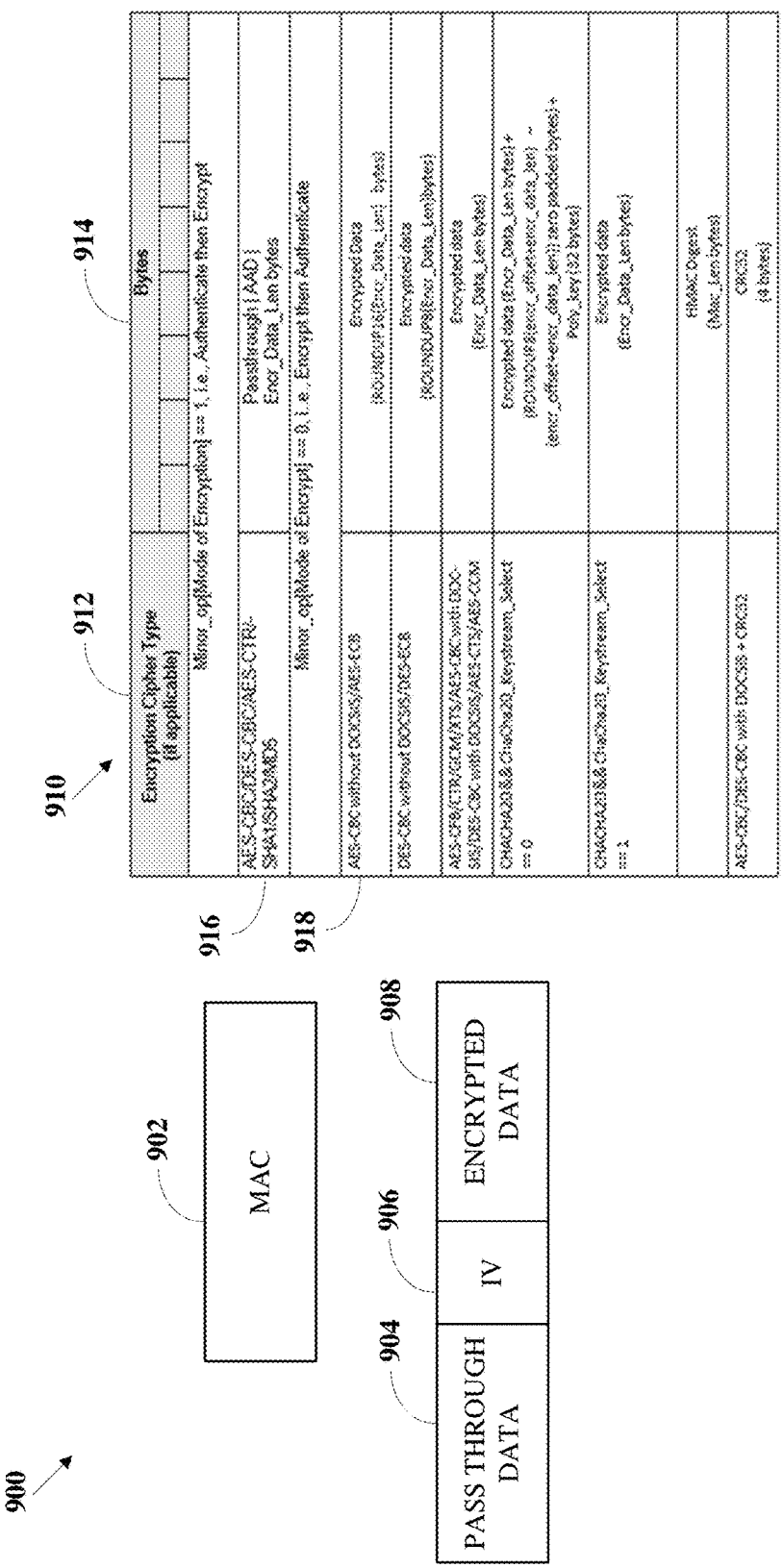

GENERIC CRYPTOGRAPHY WRAPPER

CROSS-REFERENCE TO RELATED APPLICATION(S)

This application claims priority to and the benefit of U.S. Provisional Application Patent Ser. No. 63/027,106, filed May 19, 2020, the entire disclosure of which is hereby incorporated by reference.

TECHNICAL FIELD

This disclosure relates to cryptographic processors and more specifically to a generic cryptography wrapper that can be used with a cryptographic processors.

BACKGROUND

Many aspects of modern life are carried out (e.g., enabled, etc.) by communications using networked devices. Examples include tele-medicine; executing financial transactions; accessing personal, financial, or health records; making airline or hotel reservations; on-line shopping; transmitting driving commands from a tele-operator to an autonomous vehicle; communications (such as via real-time communication (RTC) sessions) between individuals; and the like. Such communications are carried out securely to protect against eavesdropping or corruption (e.g., modification, tampering, etc.) of communicated data, and/or to ensure authenticity of the communicated data and/or of the sender or the receiver of the communicated data.

Cryptography is a key aspect in making communications (or, more broadly, a network infrastructure) or data at rest (e.g., stored data) secure. Many protocols, frameworks, libraries, applications and the like have been developed and are used to provide data security or identity (such as of the communicating users) security. A protocol can support multiple algorithms (e.g., primitives) and a combination of the algorithms can be used during a secure communications session. The combination of the algorithms may be referred to as a cipher suite.

SUMMARY

Disclosed herein are implementations of a generic cryptography wrapper.

A first aspect is an apparatus for performing cryptographic primitives. The apparatus includes a processor that is configured to receive an instruction to perform a cryptographic primitive, where the instruction includes one or more operands, at least one of the operands indicates one or more data structures that include values for the cryptographic primitive, and where the values include a first value indicating a mode of encryption that indicates an order of performing an encryption operation and an authentication operation and a second value indicating a cipher type; and perform the cryptographic primitive and store an output of the cryptographic primitive in an output data structure.

A second aspect is a method for using a cryptographic processor. The method includes establishing a secure communications session with a peer, where establishing the secure communications session includes identifying at least one of an encryption cipher or a hashing cipher, and an encryption key; configuring one or more data structures for a cryptographic primitive to be performed by the cryptographic processor, where the one or more data structures include an encryption cipher type, an encryption initialization vector source, a message authentication code cipher algorithm, and a mode of encryption relating to an order of performing an encryption operation and an authentication operation; identifying plaintext data for transmission to the peer; configuring an input data structure for the cryptographic primitive, where configuring the input data structure includes adding the plaintext data for transmission to the peer to the input data structure; invoking an opcode, which causes the cryptographic processor to perform the cryptographic primitive and place a ciphertext that is output by the cryptographic primitive in an output structure; and transmitting a secure message using the ciphertext to the peer.

A third aspect is a method for performing cryptographic primitives. The method includes receiving an instruction to perform a cryptographic primitive, where the instruction include one or more operands, at least one of the operands indicates one or more data structures that include values for the cryptographic primitive, and where the values include a first value indicating a mode of encryption, where the mode of encryption indicates an order of performing an encryption operation and an authentication operation and a second value indicating a cipher type; performing the cryptographic primitive; and storing an output of the cryptographic primitive in an output data structure.

A fourth aspect is an apparatus for performing cryptographic primitives. The apparatus includes means for providing an instruction to perform a cryptographic primitive, where the instruction includes one or more operands, and where at least one of the operands indicates one or more data structures that include values for the cryptographic primitive, including a value indicating a cipher type; and means for performing the cryptographic primitive in response to receiving the instruction and storing an output of the cryptographic primitive in an output data structure, where an order of performing an encryption operation and an authentication operation as part of performing the cryptographic primitive is dependent on the cipher type.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4 is a flowchart of a technique for performing cryptographic primitives.

FIG. 5 is a diagram of an example of a layout of an instruction and operands.

FIG. 6 is a table that illustrates semantics of bits of a major opcode and a minor opcode.

FIG. 8 is an example of an input memory space.

FIG. 9 is an example of an output memory space.

DETAILED DESCRIPTION

Figure 1:
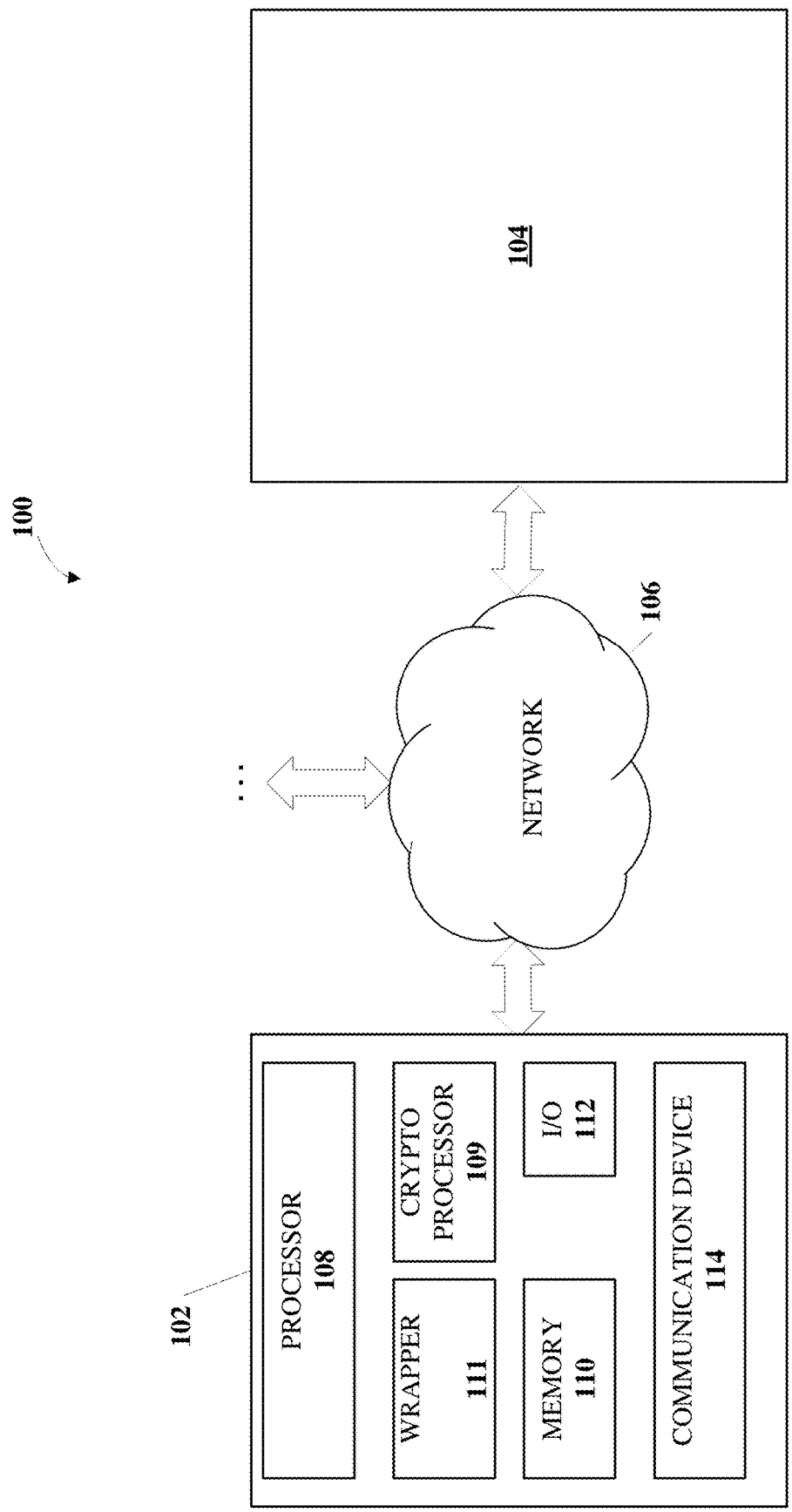
FIG. 1 is a diagram of an example of an environment where a generic cryptography wrapper can be used.

As mentioned, many cryptographic primitives have been developed and are used to enable secure communications and to secure data at rest. Cryptographic primitives can be used by (e.g., included in, implemented by, leveraged by, etc.) secure protocols, applications, utilities, frameworks, operating system libraries, and the like. For example, protocols for secure communications include, but are not limited to, Internet Protocol Security (IPsec), Secure Sockets Layer (SSL), Transport Layer Security (TLS), and Media Access Control Security (MACsec). For example, frameworks that include (e.g., implement, support, etc.) secure communications include, but are not limited to, Data Over Cable Service Interface Specification (DOCSIS), Operational Data Provisioning (ODP), and the Data Plane Development Kit (DPDK).

IPsec provides secure communications between two devices communicating over an Internet Protocol (IP) network. IPsec can be used to authenticate and encrypt data packets transmitted using the IP protocol. SSL and TLs are transport layer protocols for secure communications. MACsec, defined by the IEEE standard 802.1AE, provides point-to-point security on Ethernet links and can be used in combination with other security protocols, such as IPsec and SSL, to provide end-to-end network security. DOCSIS, which can be used for two-way communication of IP data packets between a computer network and cable television network, includes a security library that provides a framework for managing and provisioning security protocol operations. The security operations can be offloaded to hardware-based devices (e.g., a cryptographic processor). ODP is framework for operational analytics for decision making in operative business processes and for data extraction and replication. DPDK defines Application Programming Interfaces (APIs) that support different cryptographic primitives, including cipher, authentication, chained cipher/authentication and authenticated encryption with associated data (AEAD) symmetric and asymmetric cryptographic operations.

At the start of a secure communications session (such as using IPsec, TLS, or SSL), communicating peer devices (e.g., applications, frameworks, or utilities therein) may determine (such as during a handshake or a call set-up process) the cipher suite to be used. As such, a security context can be set during (e.g., by, as a result of, etc.) the handshake process. A cipher is an algorithm (e.g., a set of steps) for performing a cryptographic primitive (e.g., function, etc.). Cryptographic primitives include encryption, decryption, hashing, or digital signing.

Other uses of cryptographic primitives are possible and the disclosure is not limited to those mentioned herein. While not specifically detailed herein, a person skilled in the art recognizes that the disclosure herein also applies to data-at-rest security (such as encryption). For examples, operating systems may use encryption to keep passwords secret, conceal some parts of the system, or to ensure that updates and patches are from trusted sources (such as the maker of the system being updated or patched); and as an example of securing data at rest, an entire drive (i.e., the data therein) may be encrypted and the correct credentials may be required to access (e.g., decrypt and read) the data.

In the context of development (e.g., application development), the application developer may choose a cipher suite or a set of crypto algorithms to be used, such as for secure communications or the application developer may be an implementor of a particular cryptographic algorithm. For example, the application may use or may be a protocol, a library, a framework, a utility, or the like, that may use or implement several cryptographic algorithms and the application developer may select one or more of the several cryptographic algorithms for use in the application.

Cryptographic processing can consume significant computational resources including, but not limited to, compute time, clock time, memory, and power (battery or electricity). A server (e.g., an e-commerce server, an RTC server, etc.) may, at any point in time, have thousands of concurrently active secure communication sessions. As another example, a user device with limited resources (e.g., a mobile phone, a tablet, a wearable device, a personal computer, or the like) may participate in one or more simultaneous secure sessions.

A specialized hardware processor (referred to herein as a cryptographic processor) can be used to reduce computational resource utilization of cryptographic primitives. Cryptographic primitives can be offloaded to the cryptographic processor. For example, the cryptographic processor may be used for random number generation (which can be used with respect to digital keys), hash processing (which can be used for message authentication), and/or stream and/or block encryption or decryption. A protocol, an application, a utility, a framework, an operating system library, or any other type of program that offloads execution (e.g., performance, etc.) of a cryptographic primitive to a cryptographic processor is referred to herein as a cryptographic-primitive requester.

The cryptographic processor can support many different cryptographic primitives. Different cryptographic primitives may be associated with one or more instructions of an instruction set of the cryptographic processor. To offload processing of cryptographic primitives to the cryptographic processor, a developer of a cryptographic-primitive requester may have to know and use (e.g., configure, etc.) the respective appropriate instructions of the instruction set and the proper use (e.g., operand set up, etc.) of the appropriate instructions including framing (e.g., setting up, configuring, etc.) the contexts for the different instructions. As such, it can be onerous for an application developer to draft program instructions to offload cryptographic primitive processing of a cryptographic-primitive requester to the cryptographic processor. Additionally, experience gained by the developer in using the cryptographic processor with one set of cryptographic primitives may not be portable (e.g., re-usable) with other cryptographic primitives.

As such, a generic cryptography wrapper as described herein can be used to simplify and streamline cryptographic-primitive requester development therewith providing flexibility, simplification, error avoidance, and experience portability to other domains when using the cryptographic processor. The various cryptographic primitives (e.g., encryption and authentication primitives) of different domain protocols (e.g., IPsec, TLS, SSL, DOCSIS, etc.) that may be supported (e.g., implemented by, etc.) by the cryptographic processor can be used under (e.g., via, through, etc.) the generic cryptography wrapper.

The generic cryptography wrapper can be unaware of (e.g., agnostic to, etc.) the application-level protocol of an application that issues requests to the cryptographic processor via the generic cryptography wrapper to perform cryptographic primitives. The generic cryptography wrapper can process and meet the requirement of the protocol specific cryptography functionality with a generalized approach. To illustrate, and without limitations, an application that may be using a particular protocol (e.g., SSL, TLS, etc.) may issue requests to perform cryptographic primitives to the generic cryptography wrapper. The requests need not include details of the particular protocol. That is, for example, the generic cryptography wrapper may not be configured for the particular protocol in order to perform the cryptographic primitives requested.

As the generic cryptography wrapper can be agnostic to specific protocols, cryptographic accelerations of additional frameworks may be possible to support without change in the generic cryptography wrapper. Additional frameworks can be supported by providing wrapper-specific parameters inline (such as by configuring context and input parameters as described herein). To illustrate, and without limitations, a current iteration of a cryptography processor with which the generic cryptography wrapper is used may not support hardware security modules (HSMs) (such as for safeguarding and managing encryption and decryption digital keys). When a next iteration of the cryptography processor supports HSMs, the generic cryptography wrapper need not be modified. Rather requests to the cryptography processor via the generic cryptography wrapper to use HSMs can be via request configuration of the generic cryptography wrapper.

FIG. 1 is a diagram of an example of an environment 100 where a generic cryptography wrapper can be used. In FIG. 1, the environment 100 can include multiple apparatuses and networks, such as an apparatus 102, an apparatus 104, and a network 106. The apparatuses can be implemented by any configuration of one or more computers, such as a microcomputer, a mainframe computer, a supercomputer, a general-purpose computer, a special-purpose/dedicated computer, an integrated computer, a database computer, a remote server computer, a personal computer, a laptop computer, a tablet computer, a cell phone, a personal data assistant (PDA), a wearable computing device, or a computing service provided by a computing service provider (e.g., a web host or a cloud service provider).

In some implementations, the computing device can be implemented in the form of multiple groups of computers that are at different geographic locations and can communicate with one another, such as by way of a network. While certain operations can be shared by multiple computers, in some implementations, different computers can be assigned to different operations. In some implementations, the environment 100 can be implemented using general-purpose computers with a computer program that, when executed, performs any of the respective methods, algorithms, and/or instructions described herein. In addition, or alternatively, for example, special-purpose computers/processors including specialized hardware can be utilized for carrying out any of the methods, algorithms, or instructions described herein.

The apparatus 102 can include a processor 108 and a memory 110. The processor 108 can be any type of device or devices capable of manipulating or processing data. The terms "signal," "data," and "information" are used interchangeably. The processor 108 can include any number of any combination of a central processor (e.g., a central processing unit or CPU), a graphics processor (e.g., a graphics processing unit or GPU), an intellectual property (IP) core, an application-specific integrated circuits (ASIC), a programmable logic array (e.g., a field-programmable gate array or FPGA), an optical processor, a programmable logic controller, a microcontroller, a microprocessor, a digital signal processor, or any other suitable circuit. The processor 108 can also be distributed across multiple machines (e.g., each machine or device having one or more processors) that can be coupled directly or connected via a network.

The memory 110 can be any transitory or non-transitory device capable of storing instructions and data that can be accessed by the processor (e.g., via a bus). The memory 110 herein can include any number of any combination of a random-access memory (RAM), a read-only memory (ROM), a firmware, an optical disc, a magnetic disk, a hard drive, a solid-state drive, a flash drive, a security digital (SD) card, a memory stick, a compact flash (CF) card, or any suitable type of storage device. The memory 110 can also be distributed across multiple machines, such as a network-based memory or a cloud-based memory. The memory 110 can include data, an operating system, and one or more applications. The data can include any data for processing (e.g., an audio stream, a video stream, or a multimedia stream). An application can include instructions executable by the processor 108 to generate control signals for performing functions of the methods or processes disclosed herein.

In some implementations, the apparatus 102 can further include a secondary storage device (e.g., an external storage device). The secondary storage device can provide additional memory when high processing needs exist. The secondary storage device can be any suitable non-transitory computer-readable medium, such as a ROM, an optical disc, a magnetic disk, a hard drive, a solid-state drive, a flash drive, a security digital (SD) card, a memory stick, or a compact flash (CF) card. Further, the secondary storage device can be a component of the apparatus 102 or can be a shared device accessible by multiple apparatuses via a network. In some implementations, the application in the memory 110 can be stored in whole or in part in the secondary storage device and loaded into the memory 110 as needed for processing.

The apparatus 102 can further include an input/output (I/O) device (i.e., I/O device 112). The I/O device 112 can also be any type of input devices, such as a keyboard, a numerical keypad, a mouse, a trackball, a microphone, a touch-sensitive device (e.g., a touchscreen), a sensor, or a gesture-sensitive input device. The I/O device 112 can be any output device capable of transmitting a visual, acoustic, or tactile signal to a user, such as a display, a touch-sensitive device (e.g., a touchscreen), a speaker, an earphone, a light-emitting diode (LED) indicator, or a vibration motor. For example, the I/O device 112 can be a display to display a rendering of graphics data, such as a liquid crystal display (LCD), a cathode-ray tube (CRT), an LED display, or an organic light-emitting diode (OLED) display. In some cases, an output device can also function as an input device, such as a touchscreen.

The apparatus 102 can further include a communication device 114 to communicate with another apparatus via a network 106. The network 106 can be any type of communications networks in any combination, such as a wireless network or a wired network. The wireless network can include, for example, a Wi-Fi network, a Bluetooth network, an infrared network, a near-field communications (NFC) network, or a cellular data network. The wired network can include, for example, an Ethernet network. The network 106 can be a local area network (LAN), a wide area networks (WAN), a virtual private network (VPN), or the Internet. The network 106 can include multiple server computers (or "servers" for simplicity). The servers can interconnect with each other. One or more of the servers can also connect to end-user apparatuses, such as the apparatus 102 and the apparatus 104. The communication device 114 can include any number of any combination of device for sending and receiving data, such as a transponder/transceiver device, a modem, a router, a gateway, a wired network adapter, a wireless network adapter, a Bluetooth adapter, an infrared adapter, an NFC adapter, or a cellular antenna.

The apparatus 102 can include a cryptographic processor 109 and a generic cryptographic wrapper 111. The apparatus 102 can include one or more cryptographic-primitive requesters that offload performance of one or more cryptographic primitives to the cryptographic processor 109. In an example, the generic cryptographic wrapper 111 and the cryptographic processor 109 can be integrated into one unit. In an example, the generic cryptographic wrapper 111 can be a library or the like that provides an Application Programming Interface (API) that a cryptographic-primitive requester can use to offload the execution of a cryptographic primitive to the cryptographic processor 109. The API can be an instruction of the instruction set of the cryptographic processor 109.

The cryptographic-primitive requester can use the generic cryptographic wrapper 111 to configure context data and input data to be used by the cryptographer processor 109 to complete (e.g., execute, carry out, perform, etc.) cryptographic primitives indicated by the configuration. The cryptographer processor 109 can include micro code (for example, coded in an assembly language of the cryptographer processor 109) to parse (e.g., read, interpret, etc.) the context data and input data as described herein to perform the cryptographic primitives.

The output of cryptographic primitive (e.g., encrypted data, a MAC value, etc.) can be provided to the cryptographic-primitive requester. Several techniques can be available for providing the output of the cryptographic primitive to the cryptographic-primitive requester. For example, the cryptographic-primitive requester can use a pole mode. In the pole mode, cryptographic-primitive requester can continually pole a completion memory location (i.e., where the cryptographic processor write a status indicating completion of the cryptographic primitive). In an example, an interrupt can be raised by the cryptographic processor to indicate completion of the cryptographic primitive. Responsive to the completion of the cryptographic primitive, the cryptographic-primitive requester can read a status indicator (e.g., an error condition or successful completion) and/or read the output from an output memory space, as described herein.

The apparatus 102 can securely communicate with the apparatus 104 via the network 106. That the apparatus 102 securely communicates with the apparatus 104 can include that a cryptographic-primitive requester of the apparatus 102 (such as an application, a utility, a library, or the like stored in the memory 110 or an HSM (not shown) of the apparatus 102) offloads cryptographic-primitives to the cryptographic processor 109 via the generic cryptographic wrapper 111 to effectuate the secure communication.

The apparatus 104 can have a configuration that may be similar to the that of the apparatus 102. The apparatus 102 can communicate with the apparatus 104 via the network 106. The apparatus 102 and the apparatus 104 can also communicate with other apparatuses (not shown) connected to the network 106.

It should also be noted that parts or components of the apparatus 102 and the apparatus 104 and the environment 100 can include elements not limited to those shown in FIG. 1. Without departing from the scope of this disclosure, the apparatus 102 and the apparatus 104 and the environment 100 can include more or fewer parts, components, and hardware or software modules for performing various functions in addition or related to offloading cryptographic primitives to a cryptographic processor using a generic cryptographic wrapper.

Figure 2:
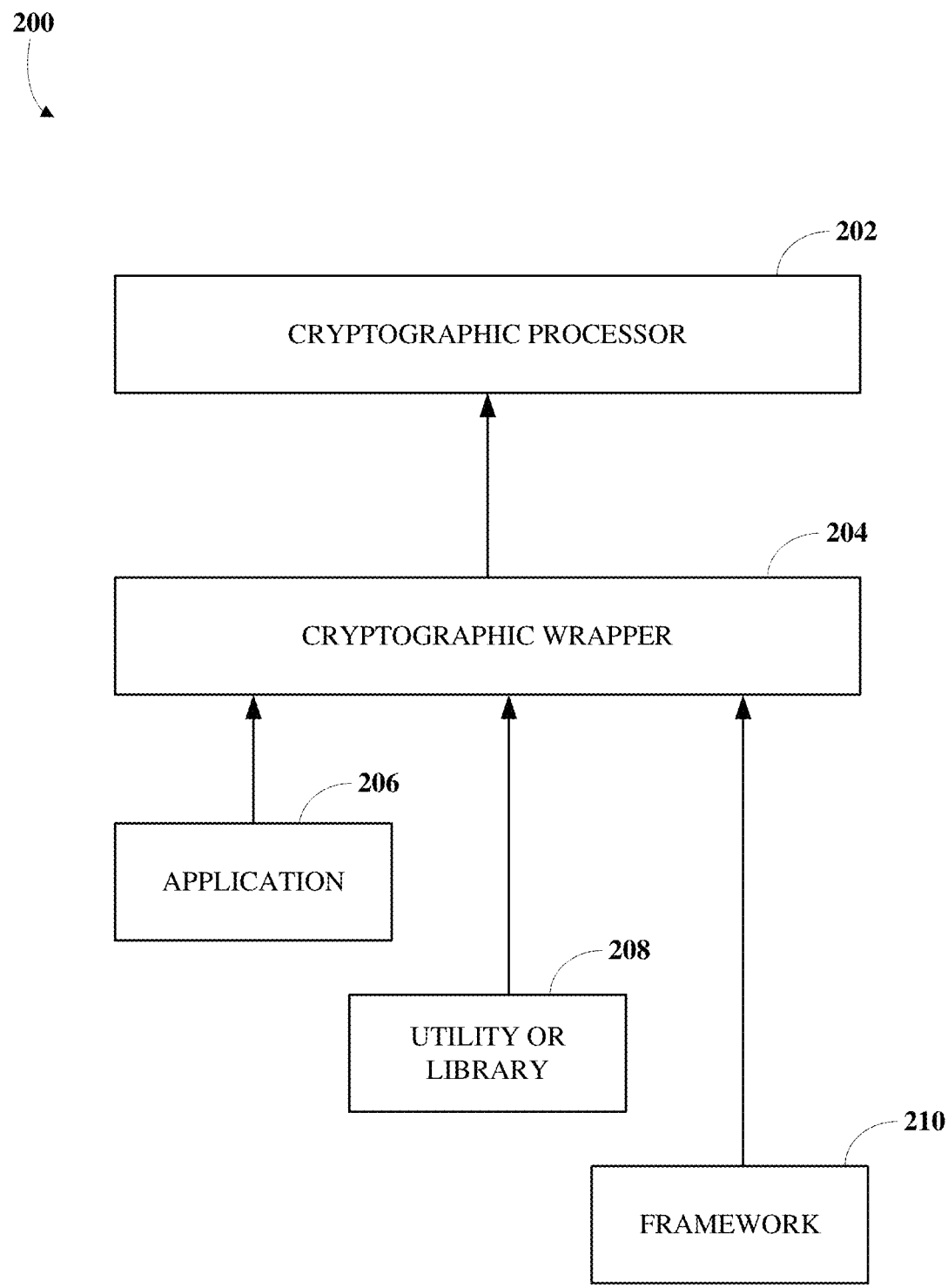
FIG. 2 is a diagram of an example of using a cryptographic wrapper.

FIG. 2 is a diagram of an example 200 of using a cryptographic wrapper. The example 200 includes a cryptographic processor 202, which can be or can be similar to, the cryptographic processor 109 of FIG. 1; and a generic cryptographic wrapper 204, which can be or can be similar to, the generic cryptographic wrapper 111 of FIG. 1. One or more cryptographic-primitive requesters can offload cryptographic primitives to the cryptographic processor 202. Offloading a cryptographic primitive to the cryptographic processor 202 can mean causing the cryptographic processor 202 to perform the cryptographic primitive. The one or more cryptographic-primitive requesters can offload cryptographic primitive via requests to the generic cryptographic wrapper 204.

The one or more cryptographic-primitive requesters shown in FIG. 2 include an application 206, a utility or library 208, and a framework 210. However, the disclosure is not so limited and other types of cryptographic-primitive requester are possible. By way of illustrative examples, the utility or library 208 can be an implementation of the open source OpenSSL that offloads cryptographic primitives to a hardware cryptographic processor, such as the cryptographic processor 202. As is known, OpenSSL is a general purpose cryptography library that provides an open source implementation of the SSL and the TLS protocols; and the application 206 can be an RTC video application or an email application or some other application that may encrypt data before transmission or decrypt received data. In some examples, the application 206 can, or can additionally, use the utility or library 208 or the framework 210. As such, cryptographic primitives may be performed (e.g., offloaded to the cryptographic processor 202) by the utility or library 208 or the framework 210 responsive to the application 206.

During the development of a cryptographic-primitive requester (such as of the application 206, the utility or library 208, or the framework 210), the generic cryptographic wrapper 204 may be, or may have a corresponding, development component (e.g., a library) or the like that can be used by the developer. The developer can include, in the source instructions (e.g., source code, etc.) of the cryptographic-primitive requester, instructions to the development component. The developer may provide configuration information to the instructions to the development component according to the application needs of the cryptographic primitives to be offloaded.

The source instructions, including the instructions to the development component, may be compiled, linked, assembled, or the like, such that, when executed, the instructions to the development component cause the cryptographic primitives described in the instructions according to the configuration information to be offloaded to the cryptographic processor 202.

Figure 3:
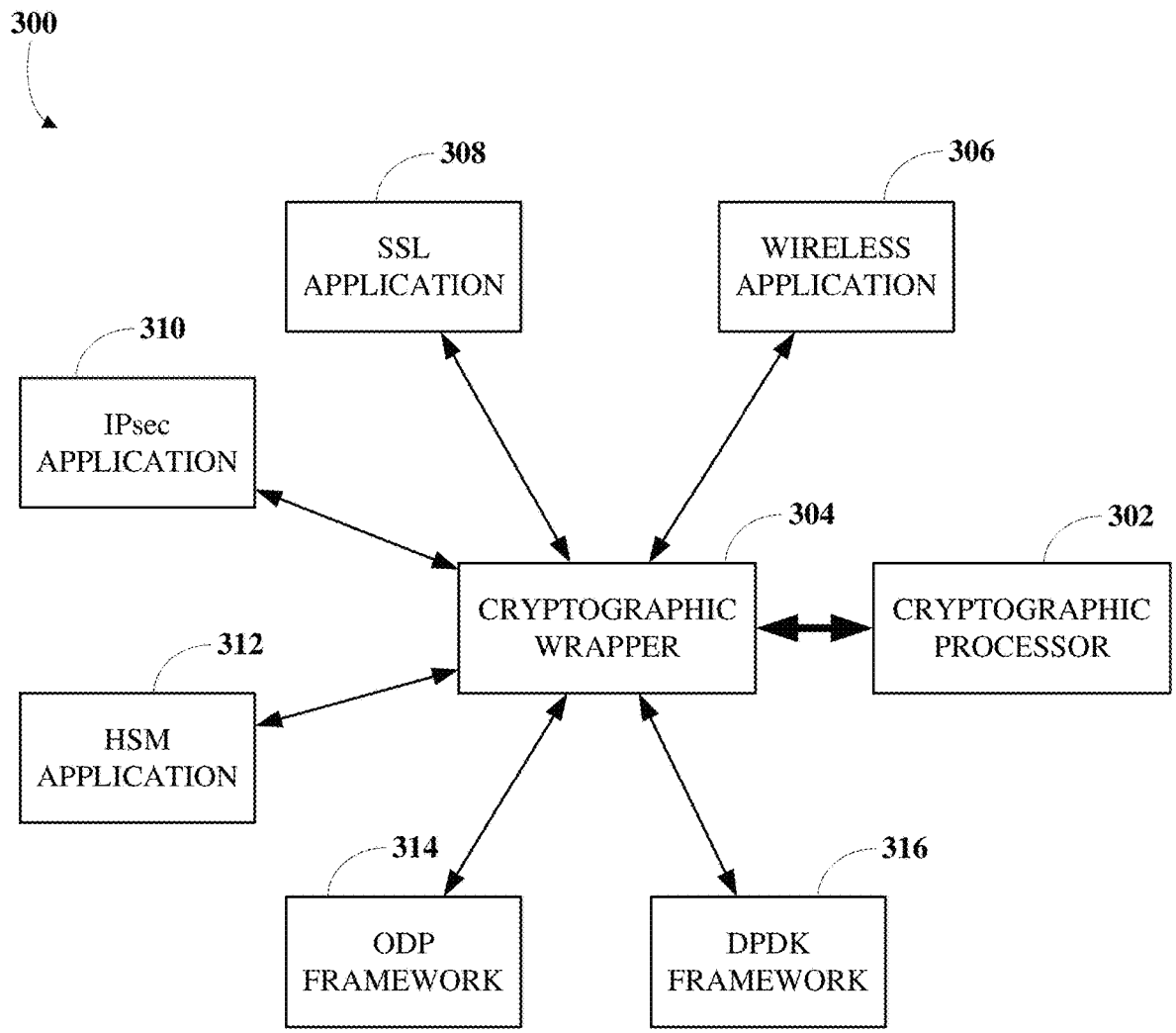
FIG. 3 is a diagram of an example of use cases of using a cryptographic wrapper.

FIG. 3 is a diagram of an example 300 of use cases of using a cryptographic wrapper. The example 300 includes a cryptographic processor 302, which can be the cryptographic processor 302 of FIG. 2 or the cryptographic processor 109 of FIG. 1; and a cryptographic wrapper 304, which can be the generic cryptographic wrapper 111 of FIG. 1 or the generic cryptographic wrapper 204 of FIG. 2.

The example 300 includes several examples of cryptographic-primitive requesters. However, other cryptographic-primitive requesters are possible. The cryptographic-primitive requesters of the example 300 include a wireless application 306, an application 308 that uses SSL, an application 310 that uses IPsec, an application 312 that uses HSM, an ODP framework implementation 314, and a DPDK framework implementation 316. The cryptographic-primitive requesters of the example 300 offload at least some cryptographic primitives to the cryptographic processor 302 by making requests to the cryptographic wrapper 304. Responsive to the requests to the cryptographic wrapper 304, the cryptographic processor 302 performs the cryptographic primitives.

FIG. 4 is a flowchart of a technique 400 for performing cryptographic primitives. Performing a cryptographic primitive can include receiving 402 an instruction to perform a cryptographic primitive and performing 404 the cryptographic primitive and storing an output of the cryptographic primitive in an output data structure.

The technique 400 can be implemented, in part or in whole, by a generic cryptographic wrapper, such as the generic cryptographic wrapper 111 of FIG. 1, the generic cryptographic wrapper 204 of FIG. 2, or the cryptographic wrapper 304 of FIG. 3. The technique 400 can be implemented, in part or in whole, by a cryptographic processor, such as the cryptographic processor 109 of FIG. 1, the cryptographic processor 202 of FIG. 2, or the cryptographic processor 302 of FIG. 3. The technique 400 can be implemented by an apparatus, such as the apparatus 102 of FIG. 1. The technique 400 can be implemented, in whole or in part, as a software program that may be executed by the apparatus. The software program can include machine-readable instructions that may be stored in a memory such as the memory 110, and that, when executed by a processor, such as the processor 108 or the cryptographic processor 109 of FIG. 1, may cause the apparatus to perform at least portions of the technique 400.

At 402, the technique 400 receives an instruction to perform a cryptographic primitive. In an example, the instruction can be an instruction of an instruction set of the cryptographic processor. In an example, the instruction can be an instruction of the generic cryptographic wrapper. In an example, the instruction can be translated into one or more instructions of an instruction set of the cryptographic processor. The translation into one or more instructions of the cryptographic processor can depend on operand values (e.g., a configuration) of the instruction. For example, the cryptographic processor can read the configuration information to determine the cryptographic primitive to be performed and to perform the cryptographic primitive. As described herein, the configuration information can include at least one of contextual data or input data.

The cryptographic primitive can be an instruction to perform an encryption of input, an instruction to perform a hash-based message authentication code authentication (HMAC) of the input data, other instruction, or a combination thereof. The instruction can include one or more operands. The instructions and the one or more operands can be as described with respect to FIG. 5.

At 404, the technique 400 performs the cryptographic primitive and stores an output of the cryptographic primitive in an output data structure. The output data structure can be as described with respect to FIG. 9.

FIG. 5 is a diagram of an example 500 of a layout of an instruction and operands. In an example, the instruction can be given by a combination of a major opcode 502 and a minor opcode 504. The example 500 includes a context operand 506, an input data operand 508, and an output data operand 510. As mentioned above, a security context can be set up (such as between communicating peers) during a handshake process. The security context can be used to configure at least one of a minor opcode 504, the context operand 506, the input data operand 508, or a combination thereof. In an example, the cryptographic-primitive requester can set (e.g., configure, etc.) one or more of the fields of the minor opcode 504, such as on a per-request basis. In an example, the context operand 506 can be used to provide configurations, which may not be changeable in a session. For example, the same context provided by the context operand 506 can be used for encryption or decryption by providing different values in the minor opcode 504.

FIG. 6 is a table 600 that illustrates semantics of bits of the major opcode 502 and the minor opcode 504. The minor opcode 504 can be configured by a cryptographic-primitive requester. It is noted that in the description herein, and unless the context indicates otherwise, statements such as field X has a value Y where the field is a context data field or an input data field, should be understood to mean that the cryptographic-primitive requester configured the field X with the value Y or that the cryptographic-primitive requester set the field X to the value Y.

A combination of values of the major opcode 502 and the minor opcode 504 can indicate the cryptographic primitive to be performed. In an example, the cryptographic primitive can be configured with (or, equivalently, the generic cryptographic wrapper can be configured so that the cryptographic processor can perform) one or more cryptographic operations related to one or both of message authentication or encryption. For example, the cryptographic primitive can be configured with one of an encrypt-then-authenticate primitive (in which an authentication operation is performed after an encryption operation has been performed), an authenticate-then-encrypt primitive (in which an encryption operation is performed after an authentication operation has been performed), an authenticate only primitive, an encrypt only primitive, more primitives, fewer primitives, other primitives, or a combination thereof.

A field 602 (e.g., bitfield 4 of the minor opcode 504 of FIG. 5) of the table 600 indicates a mode of encryption. If the field 602 has a first value (e.g., 0), then the mode of encryption is to encrypt a message first and then perform an authentication primitive, which may be referred to as the encrypt-then-authenticate, as described below. If the field 602 is configured to have a second value (e.g., 1), then the mode of encryption is to authenticate a message first and then perform an encryption primitive, which may be referred to as the authenticate-then-encrypt, as described below. The cryptographic-primitive requester can set the value of the field 602 based on, for example, a protocol that is used by the cryptographic-primitive requester. For example, if the cryptographic-primitive requester is, or is using, the IPsec stack, then the cryptographic-primitive requester can set the field 602 to the first value. For example, if the cryptographic-primitive requester is, or is using, the SSL stack, then the cryptographic-primitive requester can set the field 602 to the second value.

Encrypting a message (e.g., a cleartext or plaintext) can include authenticating the message. Message authentication or message origin authentication can be used to ensure that a message has not been modified while in transit and that the receiving party can verify the source (e.g., the identity of the sender) of the message. Authenticating a message can include performing a hash function to obtain a message authentication code (MAC). Encrypting and hashing can be separate steps. However, some encryption modes (such as Authenticated Encryption with Associated Data (AEAD) algorithms) include a MAC therewith combining the encryption and authentication steps.

As is known, the encrypt-then-authenticate (also referred to as encrypt-then-MAC) primitive can encrypt a plaintext to obtain a ciphertext, compute a message authentication code (MAC) on the ciphertext, and append it to the ciphertext. The initialization vector (IV) and an encryption method identifier can be included in the MACed data. As is also known, the authenticate-then-encrypt (also referred to as MAC-then-encrypt) primitive can compute a MAC on a plaintext, append the MAC to the plaintext, and then encrypt the combination of the cleartext with the MAC. As is also known, a encrypt-and-authenticate primitive can compute a MAC on a plaintext, encrypt the plaintext to obtain a ciphertext, and then append the MAC at the end of the ciphertext.

A field 604, when configured to a certain value (e.g., 1) indicates that 32-bit cyclic redundancy check (CRC32) is supported. For example, if the field 604 is set to 1, then a CRC-32 operation can be performed for checksum with encryption or decryption, as the case may be. A field 606, when configured to a certain value (e.g., 1) indicates that DOCSIS is supported. That is, the DOCSIS encryption with the DOCSIS padding pattern is to be used. A field 608 (e.g., bit 0 of the minor opcode 504 of FIG. 5) of the table 600 indicates, in combination with other fields, which of authentication, encryption, or decryption is to be performed. For example, if the field 608 is set to a first value (e.g., 0), then encryption and/or authentication (e.g., encryption+MAC) are to be performed. For example, if the field 608 is set to a second value (e.g., 1), then the authentication and/or decryption (MAC+decryption) are to be performed. More specifically, and in an example, if a field 702 of FIG. 7 is set to NULL, then the first value of the field 608 can indicate that the cryptographic primitive is authentication only; if a field 708 of FIG. 7 is set to NULL, then the first value of the field 608 can indicate encryption only; and if the field 608 is set to the second value and the field 602 is set to second value, then the cryptographic primitive can be to perform SSL record processing decryption.

Referring to FIG. 5 again, in an example, each of the context operand 506, the input data operand 508, and the output data operand 510 can be or can include respective memory addresses of corresponding data structures in an address space of the cryptographic-primitive requester. As such, the cryptographic-primitive requester can allocate memory in its address space for the context, the input data, and the output data of the cryptographic primitive. The cryptographic processor and the generic cryptography wrapper can have access to the memory indicated by the respective memory addresses. The cryptographic processor and the generic cryptography wrapper can have write access to at least the memory indicated by the output data operand 510. Each of the memory spaces indicated by the context operand 506, the input data operand 508, and the output data operand 510 can have defined semantics, structure, and size (such as in bytes). The semantics of a field can change depending on values of one or more other fields. Examples of the context, input, and output memory spaces are described with respect FIGS. 7-9, respectively.

Figure 7:
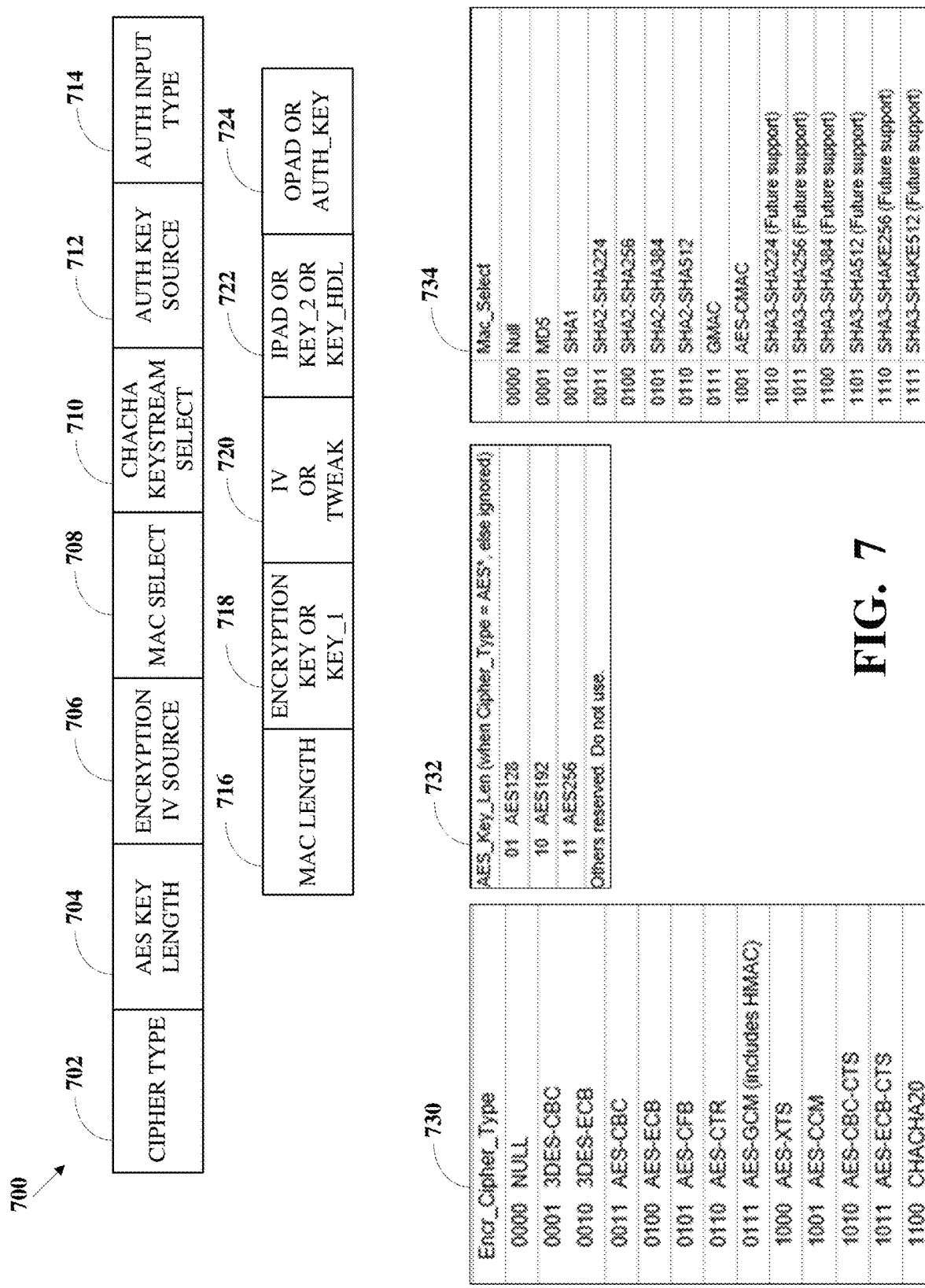
FIG. 7 is an example of a context memory space.

FIG. 7 is an example of a context memory space 700. The context memory space 700 can be configured (such as by a cryptographic-primitive requester) to include an initialization vectors (IV), encryption keys, decryption keys, processing options, more options, fewer options or a combination thereof. While one configuration and a set of semantics are described herein, other configurations or semantics are possible. Some of the fields may be have overloaded semantics. That is, some of the fields may have different semantics depending on the values of some other fields. That is, a field may contain first data that is used in a first way when one or more other fields contains second data; and the field may contain third data that is used in a second way when one or more other fields contains fourth data. Each of fields can be sized (such as in bits, bytes, or words) to fit the data to be stored therein.

At least some of context information may be optionally provided. For example, some cryptographic primitives can use initialization vectors to prevent identical sequences of text from producing the same ciphertext when encrypted. As such, an IV may not be configured in the context memory space 700 depending on the cryptographic primitive; rather, the IV may be provided on a per-request basis as input data. As such, and further described with respect to FIG. 8, IVs be can provided as input data. As such, the IVs can be optionally provided a input data or as contextual data.

A field 702 can indicate the cipher type to be used. A table 730 illustrates possible values for the field 702. The field 702 can be configured to be the value 0000 (i.e., the NULL value) to indicate that encryption is not to be performed by the cryptographic processor but that a MAC is to be obtained (e.g., calculated, etc.) by the cryptographic processor. The field 702 can be configured to a first value (e.g., the bit string 0001) to indicate that the Triple Data Encryption Algorithm (also referred to as Triple DES or 3DES) in block cipher mode (CBC) is to be used for encrypting data in the input memory space. The field 702 can be configured to be a second value (e.g., the bit string 0011) to indicate that the Advanced Encryption Standard (AES) in block cipher mode (CBC) is to be used for encrypting data in the input memory space. And so on.

In the case that the cipher type is an AES cipher type (e.g., AES-CBC, AES-ECB, AES-CFB-AES-CTR, etc.), a field 704 can be used to indicate a length of the AES key. As is known, AES allows for three different key lengths: 128, 192, or 256 bits. As such, values 01, 10, and 11 of the field 704 can used to indicate a key length of 128, 192, and 256 bits, respectively, as shown in a table 732. However, other values of the field 704 are possible.

A field 706 can be used to indicate whether the encryption IV is provided as context data (i.e., in the memory space indicated by the context operand 506) or as input data (i.e., in the memory space indicated by the input data operand 508). For example, if the field 706 is configured to be (e.g., is set to, etc.) a first value (e.g., 0), then the cryptography processor can read the encryption IV from the context data; and if the field 706 is configured to be a second value (e.g., 1), then the cryptography processor can read the encryption IV from the input data in cases where IVs are provided by cryptographic-primitive requesters (such as on per request basis).

A field 708 can be used to indicate a hash function or a message authentication code generation cipher algorithm. A table 734 illustrates an example of values of the field 708 and the corresponding hash functions to use. For example, if the field 708 is configured with a first value (e.g., 0000), then message authentication is not to be performed by the cryptographic processor; if the field 708 is configured with a second value (e.g., 0001), then the MD5 message-digest hash algorithm, which produces a 128-bit hash value, is to be performed; if the field 708 is configured with a third value (e.g., 0010), then the Secure Hash Algorithm 1 (SHA1), which is a cryptographic hash function that produces a 160-bit hash value (known as a message digest) from an input, is to be performed; and so on.

In a case where the field 702 is configured with a cipher type of ChaCha20 (e.g., the field 702 is set to a value 1100 as shown in the table 730), then a field 710 can be configured with a first value (e.g., 0) or a second value (e.g., 1). The first value can indicate that a keystream is to be calculated for every packet. The second value can indicate that the keystream is to be obtained from another field of the context memory space 700 (i.e., a field 722).

A first value (e.g., 1) of a field 712 can indicate that the cryptographic processor is to read a key used by the authentication algorithm from the input memory space indicated by the input data operand 508; and a second value (e.g., 0) of the field 712 can indicate that the key is to read from the context memory space indicated by the context operand 506. To illustrate, the field 708 may be set to a value 1001 indicating that AES with the cipher-based MAC (CMAC) is to be performed. CMAC is a block cipher-based message authentication code algorithm that can be used to provide authentication and integrity of binary data. CMAC uses a key, which can be different from the key used by the encryption method (e.g., AES). As such, the field 712 can be configured to direct the cryptographic primitive to read the CMAC key either from the context data or from the input data.

In the case of HMAC, inner padding (ipad) and outer padding (opad) values are used. In a first example, the context data may be configured to include the ipad and opad values. In another example, for at least some input data, the authentication keys can be used to obtain respective ipad and opad values. To reduce subsequent processing, the first time that the ipad and the opad values are calculated, they can be stored as context data. A field 714 can be used to indicate whether the ipad and opad values are provided as context data for use by the cryptographic processor; or whether the cryptographic processor is to calculate the ipad and opad for input data. As such, a first value (e.g., 1) of the field 714 can indicate that the cryptographic processor is to use the IV and keys to obtain the ipad and opad values; and a second value (e.g., 0) of the field 714 can indicate that the context data is configured to include the ipad and opad values to be used.

A field 716 can be configured to indicate a length of the MAC to be calculated by the cryptographic processor. A field 718 can be configured to include the encryption key. In the case that the field 702 indicates an AES (except AES-XTS) or a DES cipher type, the field 718 includes the key to be used. In case that the cipher type is AES-XTS (e.g., a value of 1000 as shown in the table 730) multiple keys are derived from the received key, as is known. The first key (e.g., KEY_1) can be stored in the field 718 and the second key (e.g., KEY_2) can be stored in another field (e.g., a field 722). However, KEY_1 and KEY_2 can be stored in other fields.

In the case that the field 706 indicates that the encryption IV is provided as context data, then a field 720 can include the encryption IV. In the case that the field 702 indicates that the AES-XTS cipher type is to be used, then the field 720 can include the tweak that is to be used along with the AES key.

The field 722 can include a first, a second, or a third value depending on other field values. The first value can be the ipad value, as described with respect to the field 714. The second value can be the second key (KEY_2) for the cipher AES-XTS, as described with respect to the field 716. The third value can be a key handle (e.g., a memory address of a the value of the key) in the case that the field 702 is configured (e.g., a value of 1100) to indicate the ChaCha20 cipher type and the field 710 is configured with the second value indicating that keystream is to be obtained from a location indicated by the key handle. In some special scenario, such as Chacha-poly, the key stream size is in kilobytes. In such cases, the field 710 can include a pointer to the key stream. The actual key stream may be in the memory space of the cryptographic-primitive requester.

A field 724 can include a first value or a second value. The first value can be the opad value as described above. In a case that the field 714 indicates that the cryptographic processor is to use the IV and keys to obtain the ipad and opad values, the second value can be the key to be used by the authentication algorithm.

FIG. 8 is an example of an input memory space 800. The input memory space 800 can be configured by the cryptographic-primitive requester. The input memory space 800 can include a header area and a data field 812. The header area can include fields 802-810. The data field 812 can be configured to include at least one of data to be encrypted, data to be authenticated, the initialization vector, the authentication key, other data, or a combination thereof.

The field 802 can include a length (such as in bits, bytes, words, or the like) of first data, within the data field 812, to be encrypted. The field 804 can include a length of second data, within the data field 812, to be authenticated. In an example, the first data to be encrypted may be the same as the second data to be authenticated. The first data and the second data are referred to herein as plaintext. In an example, the first data to be encrypted may be different from the second data to be authenticated. To illustrate the use of the fields 802 and 804, and without limitations, assume that the data field 812 is configured with the data of an IPsec packet. The IPsec packet includes a packet header and a packet payload. In IPsec, authentication starts from the packet header to include authentication of the header and the payload; and encryption is performed on the payload data. As such, the field 802 can be configured to be the length of the payload data and the field 804 can be configured to be the sum of the length of the packet header and the length of the packet payload.

In some situations, some data (i.e., pass-through data) of data field 812 may be passed through unmodified (e.g., as is) without being encrypted and/or authenticated. The field 806 indicates an offset within the data field 812 of the start of the data to be encrypted. The data before the offset is pass-through data. In the case that the field 706 of FIG. 7 is configured (e.g., set to the second value) to indicate that the encryption IV can be read from the input data, then the field 808 can indicate an offset within the data field 812 of the IV. The field 810 can indicate the offset of the data within the data field 812 to be authenticated. The pass-through data can be determined using a difference between (e.g., between the addresses of) the authentication data start (i.e., offset) and start of the data for encrypt+HMAC. That is, the pass-through data can be obtained using the difference between encryption data start and start of the data for encryption only.

The semantics of the data field 812 can be as follows.

In a first case, no encryption is to be performed by the cryptographic processor (e.g., the field 702 of FIG. 7 is set to the NULL value) and the authentication type is AES_C-MAC (e.g., the field 708 is set to the value 1001 of table 734 of FIG. 7). As such, in the first case, the cryptographic processor performs only HMAC. In the first case, if the cryptographic processor determines that the field 712 is configured to indicate that the authentication key is in the data field 812, then a number of bytes indicated by the field 704 of FIG. 7 can be the bytes that the cryptographic processor reads (e.g., uses) as the authentication key. The bytes of the authentication key can be followed by the plaintext to be authenticated. If the field 712 is configured to indicate that the authentication key is in the context memory space, then the data field 812 includes only the plaintext. The cryptographic processor can read the plaintext, which can include pass-through data and the data to be authenticated (which may be referred to as additional authenticated data (AAD)).

In a second case, the cryptographic processor is to perform encryption.

In a first example of the second case, the field 602 of FIG. 6 may be set such that the cryptographic processor is to authenticate-then-encrypt (e.g., the field 602 is set to 1). As such, the cryptographic processor obtains a MAC according to the MAC select algorithm indicated by the field 708 of FIG. 7. The cryptographic processor inserts the MAC (which is of a length indicated by the field 716 of FIG. 7) at the address indicated by the addition of the addresses in the fields 804 and 810 (e.g., value of the field 804+value of the field 810). The memory space of the data field 812 where the MAC is to be inserted by the cryptographic processor may be initialized, such as by the cryptographic-primitive requester, to zeros. As such, the data field 812 can include the plaintext data, followed by a memory space for the MAC, and followed by a padding area (in bytes). To illustrate, IPsec and SSL may perform different types of padding. As such, the cryptographic-primitive requester can configure portions of the data field 812 with the padding data.

In a second example of the second case, the field 602 of FIG. 6 may be set such that the cryptographic processor is to perform encryption-then-authentication (e.g., the field 602 is set to 0). In this case, the data field 812 can be configured to include the plaintext, which may include pass-through data, the encryption IV (if the field 706 of FIG. 7 is configured to indicate that the encryption IV is provided as input data), the AAD, and any plaintext data to be encrypted.

FIG. 9 is an example of an output memory space 900. Corresponding to the first case described with respect to FIG. 8 (i.e., that no encryption is to be performed by the cryptographic processor and the authentication type is AES_CMAC, the output memory space 900 can include a field 902 that includes the MAC that is obtained (e.g., calculated, determined, etc.) by the cryptographic processor. As such, the cryptographic processor can write to the field 902.

Corresponding to the second case described with respect to FIG. 8, the output memory space 900 can include a field 904 that includes the pass-through data, which the cryptographic processor may copy from the input memory space, an optional field 906, and a field 908 in which the cryptographic processor writes the encrypted data that is the output of the cryptographic primitive. The optional field 906 can include the encryption IV in the case that the field 706 of FIG. 7 indicates that the encryption IV is provided as input data. The cryptographic processor can copy the encryption IV from the field 720 of FIG. 7.

The field 908 can include encrypted data as described with respect to a table 910. The table 910 describes how the cryptographic processor formats the contents of the encrypted data field (i.e., the field 908) based on the cipher type (if applicable) as indicated in a column 912.

A row 916 illustrates that if the cryptographic primitive is such that the cryptographic processor is to perform authenticate-then-encrypt (i.e., in the case that the field 602 of FIG. 6 is configured to have the second value), and the field 702 or the field 708 of FIG. 7, as the case may be, is configured to be any of AES-CBC, 3DES-CBC, AES-CTR, SHA1, SHA2, or MD5, then the cryptographic processor outputs in the field 908 any pass-through data, followed by the AAD, and followed by the encrypted data of a size given by the field 802 of FIG. 8. A row 918 illustrates that if the cryptographic primitive is such that the cryptographic processor is to perform encrypt-then-authenticate (i.e., in the case that the field 602 of FIG. 6 is configured to have the first value), and the field 702 or the field 708 of FIG. 7, as the case may be, is configured to be any of AES-CBC without DOCSIS (without DOCSIS means that the field 606 of FIG. 6 is configured to a value (e.g., 0) indicates that DOCSIS is not supported) or AES-ECB, then the cryptographic processor outputs in the field 908 the encrypted data ROUNDUP16 (i.e., the encrypted data rounded up in size to a nearest multiple of 16 bytes) to a length given by the field 802 of FIG. 8. For brevity, explanations of the other rows of the table 910 are omitted as they are clear to a person skilled in the art.

The cryptographic processor can set a completion code, such as in a register or a memory location or the like that the cryptographic-primitive requester can read to determine the status of the cryptographic primitive. Respective completion codes can be associated with the following conditions that the cryptographic processor can indicate: successful completion of the cryptographic primitive, invalid data length (such as in the case that the value of the field 802 of FIG. 8 is less than 16 bytes for the cipher types AES-XTS and AES-CTS), invalid context length (such as in the case that the context operand 506 of FIG. 5 is not 23 words), invalid cipher type (such as in the case that the field 702 of FIG. 7 is set to an unsupported value, such as a value that is not listed in the table 730 of FIG. 7), invalid HMAC type (in the case that the field 708 is set to an unsupported value such as a value that is not listed in the table 734 of FIG. 7). Other conditions can be available.

Figure 10:
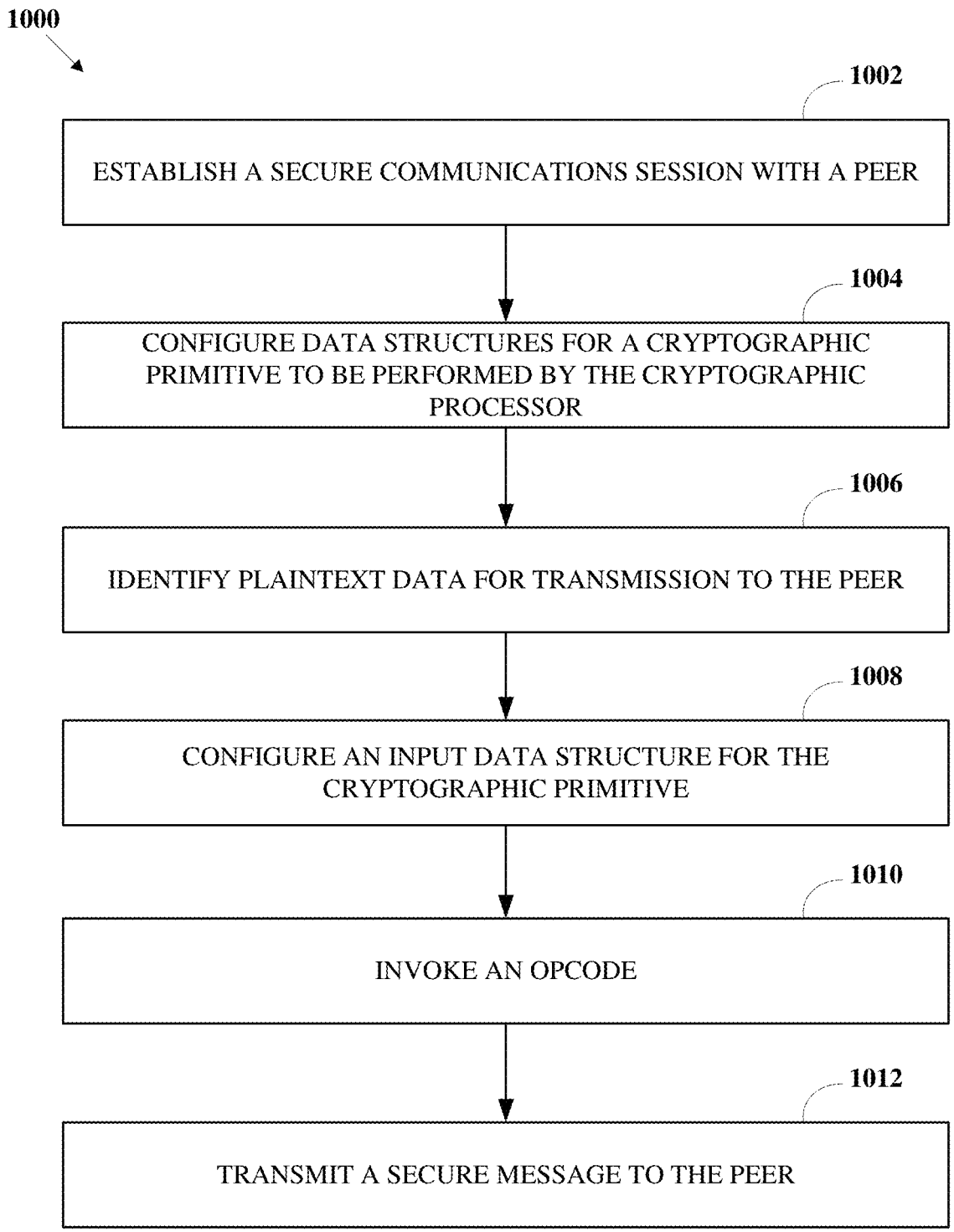
FIG. 10 is flowchart of an example of a technique for using a cryptographic processor.

FIG. 10 is flowchart of an example of a technique 1000 for using a cryptographic processor. The technique 1000 can be implemented, for example, as a software program that may be executed by an apparatus such as the apparatus 102 of FIG. 1. The software program can be a cryptographic-primitive requester that can include machine-readable instructions that may be stored in a memory such as the memory 110 of FIG. 1, and that, when executed by a processor, such as the processor 108 of FIG. 1, may cause the computing device to perform the technique 1000. The technique 1000 can be implemented using specialized hardware or firmware. Multiple processors, memories, or both, may be used.

At 1002, the technique 1000 establishes a secure communications session with a peer. For example the apparatus 102 can establish a secure communications sessions with the apparatus 104 of FIG. 1. As described herein, establishing the secure communications session can include identifying at least one of an encryption cipher or a hashing cipher, and an encryption key, such as during a handshake process.

At 1004, the technique 1000 configures one or more data structures for a cryptographic primitive to be performed by the cryptographic processor. As described above, the one or more data structures can include (and the cryptographic-primitive requester can configure) an encryption cipher type (such as described with respect to the field 702 of FIG. 7), an encryption initialization vector source (such as described with respect to the field 720 of FIG. 7), a message authentication code cipher algorithm (such as described with respect to the field 708 of FIG. 7), and a mode of encryption relating to an order of performing an encryption operation and an authentication operation (such as described with respect to the field 602 of FIG. 6).

At 1006, the technique 1000 identifies plaintext data for transmission to the peer. The plaintext may be a packet that includes a payload to be transmitted to the peer. However, other plaintext is possible. The payload can be of any type of data including by not limited to text data, audio data, image data, video data, and the like. At 1008, the technique 1000 configures an input data structure for the cryptographic primitive. For example, the cryptographic-primitive requester can configure the input data structure by adding the plaintext data for transmission to the peer to the input data structure.

At 1110, the technique 1000 invokes an opcode that causes the cryptographic processor to perform the cryptographic primitive and place a ciphertext that is output by the cryptographic primitive in an output structure. At 1112, the cryptographic-primitive requester transmits a secure message using the ciphertext to the peer.

In an example, the cryptographic processor places a message authentication code in the output structure. In an example, and as described with respect to FIG. 8, the one or more data structures can include a first length of data to be encrypted and a second length of data to be authenticated.

For simplicity of explanation, the techniques 400 and 1000 are depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the techniques 400 and 1000 (and the algorithms, methods, instructions, etc., stored thereon and/or executed thereby, including by techniques 400 and 1000) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. An apparatus for performing cryptographic primitives, comprising:
   a hardware processor configured to:
   receive an instruction to perform a cryptographic primitive,
      wherein the instruction comprises one or more operands,
      wherein at least one of the operands indicates one or more data structures that include values for the cryptographic primitive, and the values include a first value indicating a mode of encryption that indicates an order of performing an encryption operation and an authentication operation and a second value indicating a cipher type,
      wherein the one or more operands further comprises a context operand and an input data operand,
         the context operand includes per-session configurations for the cryptographic primitive and includes an initialization vector (IV) field not changeable in a session, and
         the input data operand includes values specific to the instruction,
      the input data operand includes data to be encrypted or authenticated; read an IV by:
      in response to determining that a field of the context operand indicates that the IV is provided as context data, read the IV from the IV field of the context operand; and
      in response to determining that the field of the context operand indicates that the IV is provided as input data, read the IV from the input data operand; and
   perform the cryptographic primitive using the IV and store an output of the cryptographic primitive in an output data structure.

2. The apparatus of claim 1, wherein the values further comprise:
   a third value indicating a first length of an advanced encryption standard (AES) key.

3. The apparatus of claim 2, wherein the values further comprise:
   a fourth value indicating a message authentication code (MAC) hash function.

4. The apparatus of claim 3,
   wherein the cryptographic primitive comprises using the MAC hash function to generate a MAC, and
   wherein the values further comprise:
      a second length of the MAC to be generated using the MAC hash function.

5. The apparatus of claim 1, wherein the values further comprise:

a first length of first input data to be encrypted using the cryptographic primitive; and a second length of second input data to be authenticated using the cryptographic primitive.

6. The apparatus of claim 1,
wherein the cryptographic primitive is an encryption primitive.

7. The apparatus of claim 1, wherein the cryptographic primitive is an authentication primitive.

8. The apparatus of claim 1,
wherein the instruction to perform the cryptographic primitive is received from a cryptographic-primitive requester, and
wherein a memory space of the cryptographic-primitive requester comprises the operands.

9. A method for using a cryptographic processor, comprising:
establishing a secure communications session with a peer, wherein establishing the secure communications session comprises identifying at least one of an encryption cipher or a hashing cipher, and an encryption key;
configuring one or more data structures for a cryptographic primitive to be performed by the cryptographic processor, wherein the one or more data structures comprise an encryption cipher type, an encryption initialization vector source, a message authentication code cipher algorithm, and a mode of encryption relating to an order of performing an encryption operation and an authentication operation;
identifying plaintext data for transmission to the peer;
configuring a context data structure and an input data structure for the cryptographic primitive,
wherein configuring the input data structure comprises adding the plaintext data for transmission to the peer to the input data structure,
wherein the context data structure is configured with per-session configurations for the cryptographic primitive and includes an initialization vector (IV) field not changeable in a session,
wherein the input data structure includes data to be encrypted or authenticated,
wherein a field of the context data structure is configured to indicate whether an IV is included in the context data structure or in the input data structure,
wherein, when the field indicates that the IV is included in the context data structure, the IV field of the context data structure is configured to include the IV, and
wherein, when the field indicates that the IV is included in the input data structure, data in the input data structure indicates an offset within the input data structure where the IV is stored;
invoking an opcode, wherein invoking the opcode causes the cryptographic processor to perform the cryptographic primitive using the IV and place a ciphertext that is output by the cryptographic primitive in an output structure; and
transmitting a secure message using the ciphertext to the peer.

10. The method of claim 9, wherein the cryptographic processor places a message authentication code in the output structure.

11. The method of claim 9, wherein the one or more data structures includes a first length of data to be encrypted and a second length of data to be authenticated.

12. A method for performing cryptographic primitives, comprising:

receiving an instruction to perform a cryptographic primitive,
wherein the instruction comprises one or more operands,
wherein at least one of the one or more operands indicates one or more data structures that include values for the cryptographic primitive, and the values comprise a first value indicating a mode of encryption indicating an order of performing an encryption operation and an authentication operation and a second value indicating a cipher type,
wherein the one or more operands further comprises a context operand and an input data operand,
the context operand includes per-session configurations for the cryptographic primitive and includes an initialization vector (IV) field not changeable in a session, and
the input data operand includes values specific to the instruction, the input data operand includes data to be encrypted or authenticated;
reading an IV by:
in response to determining that a field of the context operand indicates that the IV is provided as context data, read the IV from the IV field of the context operand; and
in response to determining that the field of the context operand indicates that the IV is provided as input data, read the IV from the input data operand;
performing the cryptographic primitive using the IV; and
storing an output of the cryptographic primitive in an output data structure.

13. The method of claim 12, wherein the values further comprise:
a third value indicating a first length of an advanced encryption standard (AES) key.

14. The method of claim 13, wherein the values further comprise:
a fourth value indicating a message authentication code (MAC) hash function.

15. The method of claim 14,
wherein the cryptographic primitive comprises using the MAC function to generate a MAC, and
wherein the values further comprise:
a second length of the MAC to be generated using the MAC hash function.

16. The method of claim 12, wherein the values further comprise:
a length of first input data to be encrypted using the cryptographic primitive; and
a length of second input data to be authenticated using the cryptographic primitive.

17. The method of claim 12,
wherein the cryptographic primitive is an encryption primitive.

18. The method of claim 12, wherein the cryptographic primitive is an authentication primitive.

19. An apparatus for performing cryptographic primitives, comprising:
means for providing an instruction to perform a cryptographic primitive,
wherein the instruction comprises one or more operands,
wherein at least one of the operands indicates one or more data structures that include values for the cryptographic primitive, including a value indicating a cipher type, wherein the one or more operands further comprises a context operand and an input data operand,
  the context operand includes per-session configurations for the cryptographic primitive and includes an initialization vector (IV) field not changeable in a session, and
  the input data operand includes values specific to the instruction, the input data operand includes data to be encrypted or authenticated;
means for reading an IV by:
  in response to determining that a field of the context operand indicates that the IV is provided as context data, read the IV from the IV field; and
  in response to determining that the field of the context operand indicates that the IV is provided as input data, read the IV from the input data operand; and
means for performing the cryptographic primitive using the IV in response to receiving the instruction and storing an output of the cryptographic primitive in an output data structure,
  wherein an order of performing an encryption operation and an authentication operation as part of performing the cryptographic primitive is dependent on the cipher type.

* * * * *